D. WHIPPLE & J. R. FORDYCE.
TENT OR AWNING ATTACHMENT FOR VEHICLES.
APPLICATION FILED AUG. 2, 1910.
1,018,798.
Patented Feb. 27, 1912.
5 SHEETS—SHEET 5.
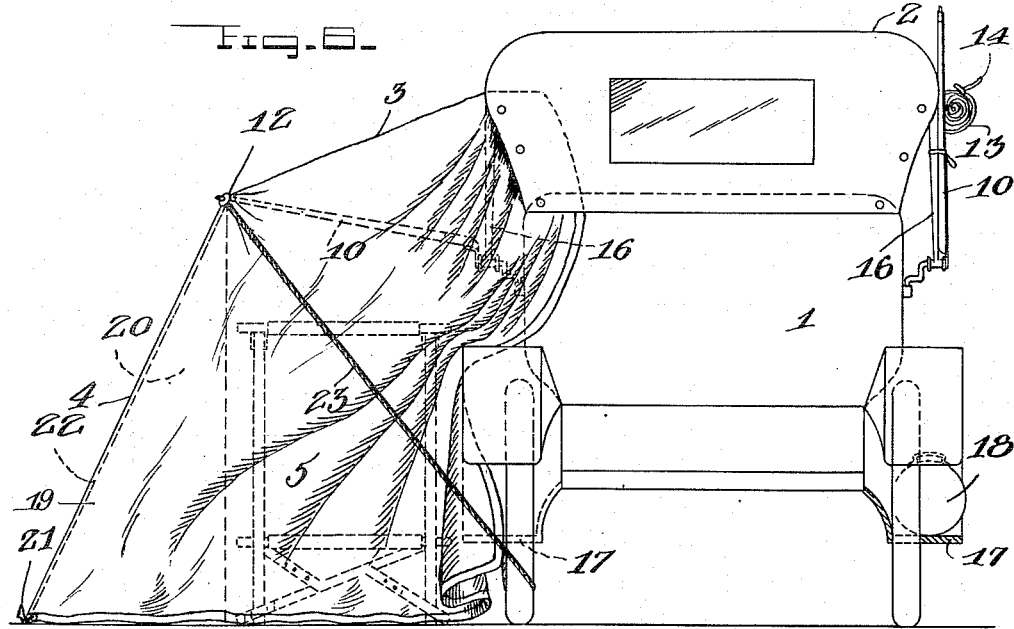
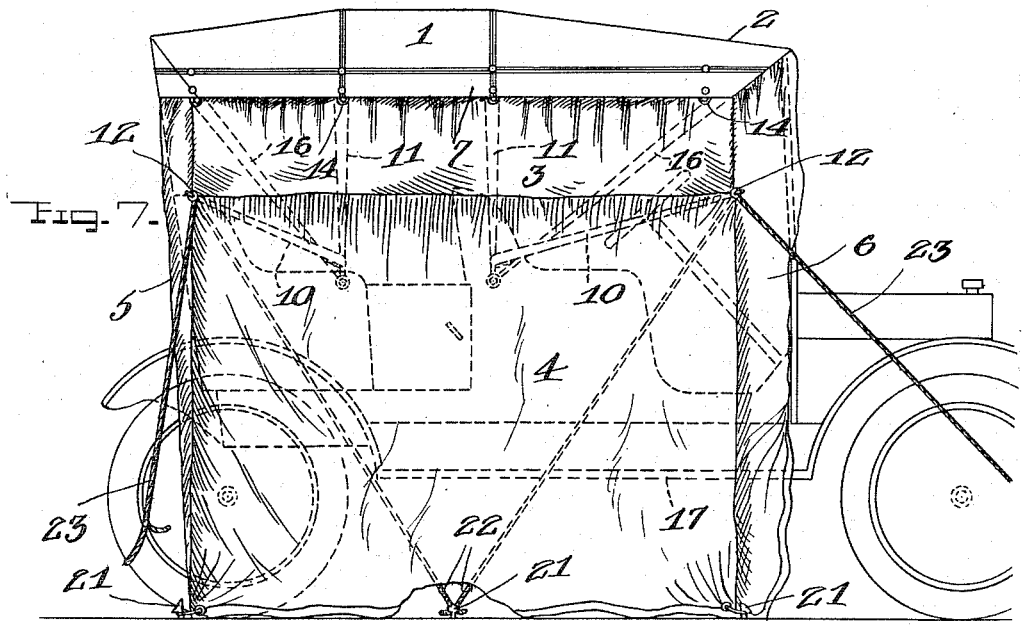
Witnesses
Inventors
John R. Fordyce
and Duran Whipple
By A. G. DuBois Co.,
their Attorney

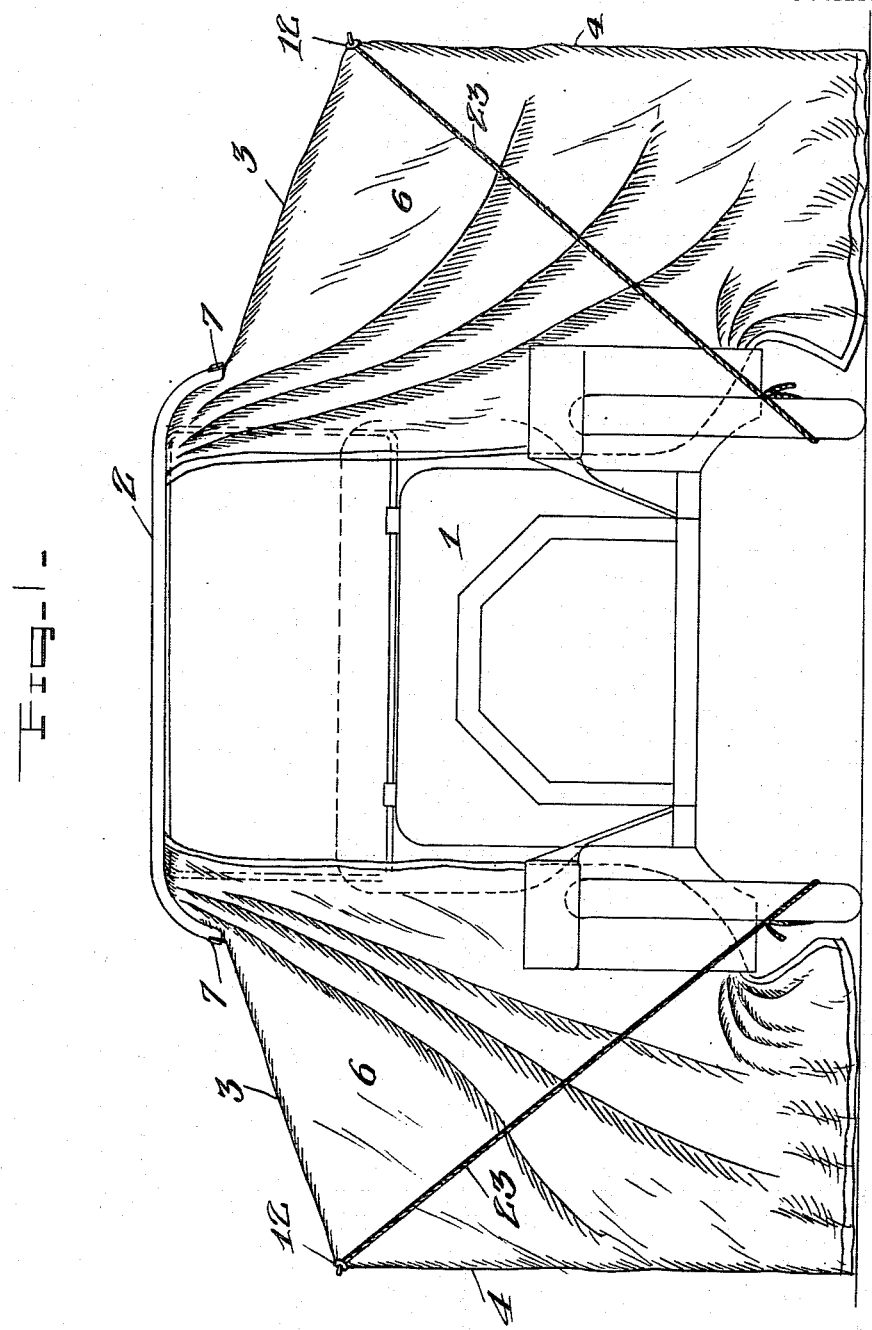

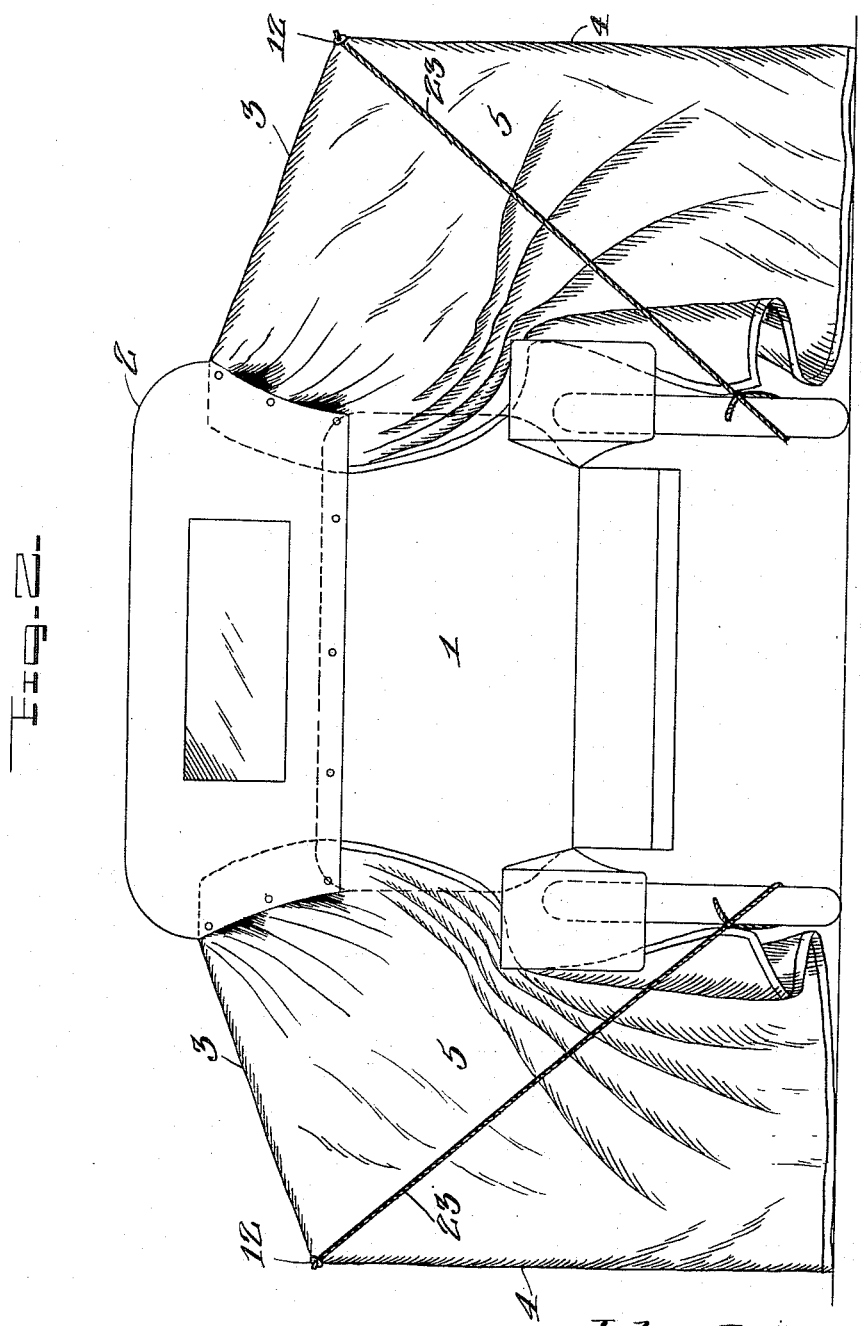

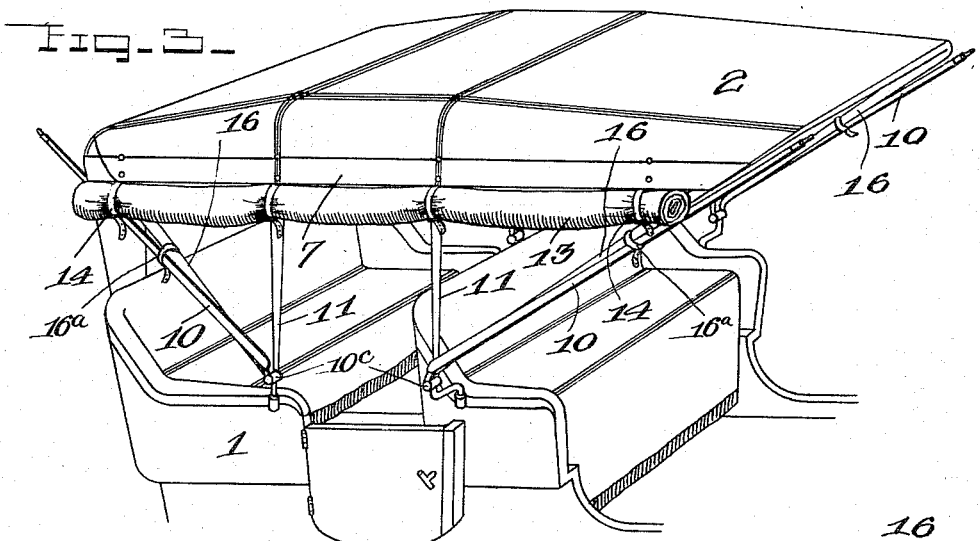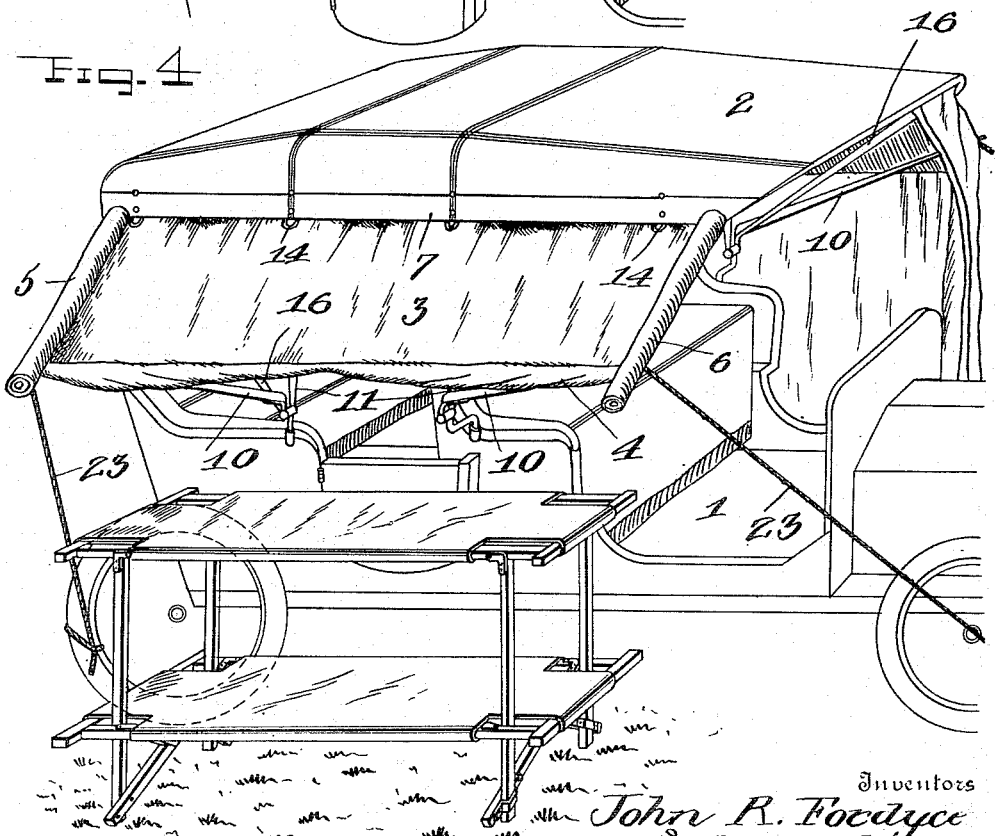

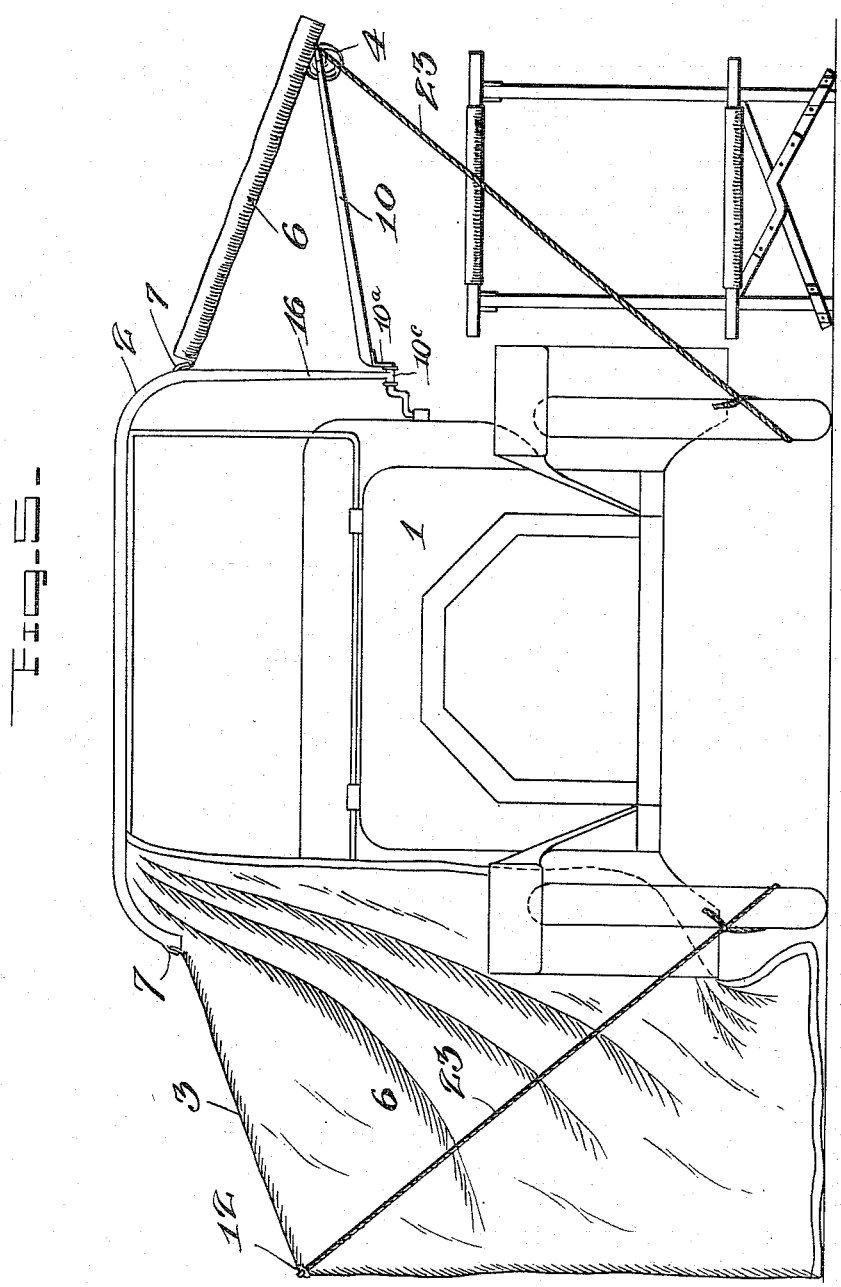

UNITED STATES PATENT OFFICE.

DURAND WHIPPLE AND JOHN R. FORDYCE, OF LITTLE ROCK, ARKANSAS.

TENT OR AWNING ATTACHMENT FOR VEHICLES.

1,018,798. Specification of Letters Patent. Patented Feb. 27, 1912.

Application filed August 2, 1910. Serial No. 575,162.

*To all whom it may concern:*

Be it known that we, DURAND WHIPPLE and JOHN R. FORDYCE, citizens of the United States, residing at Little Rock, in the county of Pulaski and State of Arkansas, have invented new and useful Improvements in Tent or Awning Attachments for Vehicles, of which the following is a specification.

Our invention relates to tent or awning attachments adapted for use in connection with vehicles, and especially designed as an accessory for automobile touring cars, to provide convenient and comfortable accommodations for touring parties.

While the invention is adapted for attachment to, and use with, carriages, wagons, and various other kinds of vehicles, it is primarily intended as a means for increasing the capacity of touring cars to convert them into sleeping or eating quarters, when journeys covering appreciable distances are taken, necessitating over-night or extended stops.

A further object of the invention is, to provide comfortable tent shelter from wind and rain, for motor car tourists, the shelter being adapted to be readily manipulated to conceal and protect sleeping cots or the like, and capable of being quickly rolled up and packed into small compass for transportation upon the car during travel, without affecting the folding or unfolding of the top of the car, or otherwise interfering with the ordinary handling or driving of the vehicle.

Broadly stated, the invention consists in a tent or awning attachment for vehicles, adapted for attachment to the side or sides, or end or ends thereof, and so constructed as to wholly or partially envelop a bed, bunk, cot, or other article located adjacent the vehicle.

The invention also comprises a tent or awning attachment, attached to the side, or end or ends, of a motor car or other vehicle, and so constructed as to provide a shelter for a cot or bed and also a concealed space serving as a dressing tent.

The invention consists further, in the provision of rods or stretchers for the tent attachment, adapted to be readily supported by the bows of the machine top, or the car frame, and to be quickly detached therefrom.

The invention also consists, in a tent or awning attachment for vehicles, provided with guy ropes adapted to be attached to the wheels, or other convenient parts of the vehicle.

The invention is susceptible of embodiment in a great variety of forms, or constructions, but will be here shown as applied to a motor touring car.

The construction of the improvement will be fully described hereinafter in connection with the accompanying drawings which form a part of this specification, and its features of novelty will be set forth and defined in the appended claim.

In the drawings:—Figure 1:— is a front elevation of a touring car provided on opposite sides with our improved tent attachment. Fig. 2:— is a rear elevation of the car with the tent attachments in unfurled position. Fig. 3:— is a fragmentary perspective view of the car, showing one manner of securing the tent attachment when rolled up, and the spreaders, to the car for transportation. Fig. 4:— is a similar view showing one of the tents partly rolled up in connection with a double-deck cot, and the other tent pitched, or in unfurled position. Fig. 5:— is a front elevation of the car. Fig. 6:— is a diagrammatic rear elevation partly in dotted lines, illustrating at one side the manner of securing the tent and stretcher, and the cots, for transportation; and at the other side, the relative position of the parts when the tent is pitched. Fig. 7:— shows a side view of the tent, and Fig. 8:— is a detail of one of the stretchers detached.

The reference numeral 1 designates a touring car provided with the usual foldable top 2.

The portable tents are adapted to be attached to one or both sides of the car, and each tent consists of a top or fly 3, a side flap 4, and two end flaps 5 and 6. The upper edge of the top of the tent is provided with means for detachably securing it to the depending side portion of the car top. We preferably form slits or openings along the top edge of the tent, and button the latter over the headed studs of the car top to which the side covers are ordinarily secured.

It will be noted (see Fig. 4) that the upper edge of the tent top extends under the depending flap 7 of the car top, thus insuring a rain-proof connection between these parts.

The front end flaps 6 of the tent are secured detachably to the front of the car (Fig. 1) in any convenient way, as by straps or fasteners and the rear end flaps 5 are attached to studs or other fastening means at the back of the car as shown in Fig. 2.

When the tents are pitched the outer vertical edges of the end flaps 5 and 6 are detachably connected to the vertical side edges of the side flaps 4. The devices for detachably connecting the side and end flaps may be of any well-known or appropriate construction, and for this reason such devices are not disclosed in the drawings. To support the tops 3 of the tents, and to hold the tents away from the sides of the car, spreaders 10 are employed. These spreaders extend upwardly and outwardly in opposite directions from the bows 11 of the car top 2, and are secured in applied position by flexible members 10$^a$. The flexible members 10$^a$ are each secured at one end to the lower ends of the spreaders 10 and are provided at their free ends with openings 10$^b$ which permit of the spreaders being secured to the pivot bolts 10$^c$ of the bows 11, as clearly shown in Figs. 3, 4, 5, 7 and 8 of the drawings. The outer ends of the spreaders pass through eyelets located in the outer corners of the tops 3. As the outer vertical edges of the end flaps 5 and 6 are detachably secured to the vertical edges of the side flaps 4, the tops 3 of the tents may only be used, as shown in Fig. 4 of the drawings. When the tops 3 of the tents are used the end flaps 5 and 6 and the side flaps 4 are folded in the manner disclosed in this figure. When it is no longer desired to use the tents, the end flaps 5 and 6 of each tent are folded one upon the other upon the top 3, after which the side flaps 4 and top 3 are rolled.

The manner in which the tents may be rolled is best shown in Fig. 3 of the drawing, and the rolls are designated by the numerals 13. The tents are secured in rolled condition to the sides of the car top 2 by means of straps 14. When the tents are not in use the spreaders 10 are secured against the outer sides of the inclined bows 16 of the car top 2 by means of straps 16$^a$.

A distinguishing feature of the invention is, that when the tent or tents are in position as shown in Figs. 1 and 2, they constitute integral parts of the car itself, and the area of the interior of the car is added to that of the tents to provide accommodations for over-night stops.

When the tents are pitched, and their sides and ends closed, and secured as shown in Figs. 1 and 2, complete protection is afforded against the weather, in connection with the usual front and back curtains of the car.

In connection with our improved tent, we may employ cots of any suitable construction, adapted to be inclosed by the tent. We preferably employ folding cots of the double-deck type, which are adapted to be folded, and then rolled up, so as to occupy little space, for transportation on the running board 17 of the car, the rolled cots 18 being secured upon the running-board by straps in any convenient manner. As shown in Fig. 6 the side flap 4 of the tent, instead of being lowered to a substantially vertical position, as shown in Figs. 1 and 2, and by dotted line in Fig. 6, may be drawn outward to the inclined position shown by the full line 19 in Fig. 6 to provide a space or compartment 20 adapted to serve as a dressing room for gentlemen, while the tonneau of the car provides a convenient dressing room for ladies of a party. When the side flap is thus drawn out to provide the compartment 20, it will be necessary to secure its lower edge by tent-pins 21 as shown in Fig. 7 and wind-guy ropes 22 are also preferably employed.

To render the tents secure against the wind, guy ropes 23 are secured at their upper ends to the tent corners, and at their lower ends to the wheels of the car at both the front and rear of the car, as shown in the drawings.

As shown in Figs. 4 and 5 of the drawings, one tent may be erected and the other used as an awning. When one of the tents is used as an awning, the top 3 is only employed, the spreaders 10 and guy ropes 23 securing the top 3 extended.

It will of course be understood, that the tent material may be canvas, rubber, or any other fabric suitable for the purpose, and further, that the means for detachably securing the tents and stretchers to the car, and for detachably connecting the parts of the tent together may be modified and varied as desired, the invention not being restricted to the details herein shown and described. And as hereinafter stated, the improved portable combination tent and awning may be employed in connection with vehicles of various kinds without regard to the character of the motive power used for their propulsion, and we reserve the right to make all such changes and modifications in construction and relative arrangement of the elements of the invention, as may fall within the terms and scope of the following claim.

Having fully described our invention what we claim as new and desire to secure by Letters Patent, is;—

The combination of a vehicle top, the frame of said top, a tent attached at its upper edge along the vehicle top, stretchers for holding the tent in extended position, and flexible means interposed between and connecting the stretchers and the frame of the vehicle top, whereby when not in use the stretchers may be positioned snugly against the frame of the vehicle top and secured in such position.

In testimony whereof we have hereunto set our hands in presence of two subscribing witnesses.

DURAND WHIPPLE.
JOHN R. FORDYCE.

Witnesses:
J. D. RUMPH,
C. D. GOLDTHWAITE.